United States Patent [19]
Saieva

[11] Patent Number: 5,944,054
[45] Date of Patent: Aug. 31, 1999

[54] VALVE FOR BREATHING SYSTEMS

[76] Inventor: Carl J. Saieva, 17 Sands La., Port Jefferson, N.Y. 11777

[21] Appl. No.: 09/006,769

[22] Filed: Jan. 14, 1998

[51] Int. Cl.[6] .................................................. F16K 11/07
[52] U.S. Cl. ...................... 137/625.4; 251/93; 251/319; 128/201.28; 128/204.26
[58] Field of Search ..................... 137/625.4, 555, 137/558, 556, 112, 113, 908; 251/319, 93, 92, 90, 89; 128/201.28, 205.24, 207.16

[56] References Cited

U.S. PATENT DOCUMENTS

| | | | |
|---|---|---|---|
| 2,912,994 | 11/1959 | Mori | 137/625.4 |
| 3,198,435 | 8/1965 | Ullman | 251/89 X |
| 3,592,215 | 7/1971 | Davis | 137/113 |
| 3,678,959 | 7/1972 | Liposky | 137/625.4 X |
| 3,701,363 | 10/1972 | Schuler et al. | 137/599 |
| 3,802,462 | 4/1974 | Trosch | 137/556 X |
| 4,550,861 | 11/1985 | Fay, Sr. et al. | 251/320 X |
| 4,619,255 | 10/1986 | Spinosa et al. | 137/113 X |
| 4,660,600 | 4/1987 | Bergeron | 137/556 X |
| 5,375,625 | 12/1994 | Reynolds | 251/89 X |
| 5,411,059 | 5/1995 | Sever et al. | 137/625.4 X |

FOREIGN PATENT DOCUMENTS

| | | | |
|---|---|---|---|
| 513779 | 2/1955 | Italy | 137/625.4 |
| 2074700 | 11/1981 | United Kingdom | 137/556 |

*Primary Examiner*—Stephen M. Hepperle
*Assistant Examiner*—John Bastianelli
*Attorney, Agent, or Firm*—Galgano & Burke

[57] ABSTRACT

A manually operable control valve for a breathing apparatus to allow a user to alternate from a primary breathing gas supply to a secondary breathing gas supply. The manually operable control valve includes an elongated valve body and a linearly reciprocal shuttle valve. The valve body includes an axial passageway having a pair of spaced-apart inlet ports. The inlet ports each have an inner end opening onto the axial passageway and an outer end which connects to a separate gas supply. The valve body also has one outlet port having an inner end opening onto the axial passageway and an outer end connectable to the breathing apparatus. The linearly reciprocal shuttle valve is slidably mounted within the axial passageway for movement between a first end position in which it establishes fluid communication between the first inlet port and the outlet port and a second end position in which it establishes fluid communication between the second inlet port and the outlet port.

12 Claims, 5 Drawing Sheets

VALVE FOR BREATHING SYSTEMS

BACKGROUND OF THE INVENTION

1. Field of the invention

The present invention relates to a manually operable control valve for a breathing apparatus to allow one to alternate from a primary breathing gas supply to a secondary breathing gas supply. More particularly, the present invention relates to such a valve which is especially intended for air masks used in life support breathing systems, such as those used in scuba diving or toxic environments.

2. Description of the Prior Art

In the field of scuba diving, valves or diverting means used to alternate from one breathing gas supply to another are well known in the art. In particular, such valves or diverting means are used when a primary breathing gas supply is exhausted and it is required that the breathing apparatus is diverted to a reserve or secondary breathing gas supply. Some of the earliest air supply diverting means were actuated by a reserve pull rod, typically attached to the neck of a scuba diving air tank. These early breathing apparatus comprise a single breathing gas supply tank with a capacity of typically, 2400 psi. In operation, the single tank provides breathing gas to a diver from a primary and a reserve supply. Of the total tank capacity, approximately 500 psi of breathing gas is restricted from the primary supply, as a remaining reserve supply. Upon exhaustion of the primary gas supply, the reserve pull rod is rotated so that the reserve gas supply is engaged, as shown in U.S. Pat. No. 3,701,363 to Schuler, et al. As can be appreciated, an actuating means comprising a reserve pull rod was not equipped with means for preventing accidental engagement or disengagement of the reserve gas supply when a diver or fireman or worker in a hazardous gaseous environment or a small space (e.g., toxic waste sites, smoke filled buildings, caves and tunnels with falling rocks and debris, etc). The accidental engagement causes depletion of the reserve gas supply without the user's knowledge. This may result in leaving the user with no remaining air supply causing injury or death.

Another means for changing a breathing gas supply is the carrying of a second mask and/or mouth piece, which is connected to the secondary breathing gas supply. Particularly, in situations where a full face mask is used, generally when the primary breathing gas supply is exhausted, a diver must remove his full face mask, which is connected to the primary breathing gas supply, and then put on a second full face mask, which is connected to the secondary breathing gas supply. As can be appreciated, the removal of the primary full face mask and connection of the secondary full face mask can be cumbersome and time consuming. Moreover, when diving in toxic or hazardous locations, the removal of a primary mask cannot only be cumbersome, but also life threatening.

In addition, in certain diving situations, a diver must dive to varying and extensive depths. When diving to a particular depth and subsequently coming to the surface, it is necessary for the diver to go through decompression. On the diver's ascent back to the surface, it is necessary for him to change the gas composition in the breathing supply to avoid what is known as the bends. In order to switch or change composition of the gas, the diver must often grasp a second mask and/or regulator. However, at greater depths, visibility is poor and there is a possibility that the diver could grasp the wrong mask or regulator and inevitably engage the wrong gas supply. Intake of the wrong breathing gas supply can result in danger to the diver's life, for example, intake of the wrong gas could result in a seizure.

As can be appreciated, these prior art designs do not prevent the dangers associated with switching from a primary breathing gas supply to a secondary breathing gas supply. In the event that a diver is confronted with a hazardous situation and cannot successfully and accurately alternate from a primary breathing gas supply to a secondary breathing gas supply the end result may be serious injury or death to the scuba diver.

Therefore, there is a present need for reliable valve or diverting means of simple construction and operation that allows a diver to switch breathing gas supplies in a short period of time, e.g., a few seconds in a safe and facile manner. Further, it is desired that such a valve is constructed from only a few components with very low probability of failure.

SUMMARY OF THE INVENTION

Accordingly, it is an object of the present invention to provide a manually operable control valve for a breathing apparatus that allows one to alternate from a primary breathing gas supply to a secondary breathing gas supply in a quick, facile and safe manner.

It is also an object of the present invention to provide such a control valve for a breathing apparatus which is specifically intended for use by scuba divers, fireman and others in toxic gaseous or oxygen-reduced environments.

It is yet another object of the present invention to provide such a control valve which is especially designed to allow for facile and easy sharing of the secondary breathing supply between two users such as in an emergency situation where one diver is entangled and must share the secondary breathing supply of a rescue diver.

It is another object of the present invention to provide a manually operable control valve having a releasable locking mechanism that maintains engagement of a selected gas supply for increased safety.

It is yet another object of the present invention to provide a manually operable control valve which is simple in design, reliable in operation, economical to manufacture and easy to install.

Certain of the foregoing and related objects are attained, according to the invention, by the provision of a manually operable control valve for a breathing apparatus that allows a user to alternate from a primary breathing gas supply to a secondary breathing gas supply. The manually operable control valve includes an elongated valve body having an axial passageway. The valve body also has a pair of spaced-apart lateral inlet ports. Each inlet port has an inner end that opens onto the axial passageway. Each inlet port also has an outer end that is connectable to a breathing gas supply. The valve body is also equipped with an outlet port which has an inner end opening onto the axial passageway and an outer end which is preferably connectable to a regulator apparatus. Mounted within the axial passageway of the valve body is a linearly reciprocable shuttle valve. The shuttle valve moves between a first end position within the valve body in which it establishes fluid communication between the first inlet port and the outlet port and a second end position in which it establishes fluid communication between the second inlet port and the outlet port.

Preferably, the shuttle valve has a length greater than that of the valve body. In yet another preferred embodiment, the axial passageway and shuttle valve have a cylindrical cross-section. Further, each end of the shuttle valve has an enlarged head, having a width greater than that of the valve body. Most desirably, the enlarged heads are disc-shaped.

The heads serve to limit the movement of the shuttle valve between the first and second end positions thereof.

In another preferred embodiment of the invention, the control valve includes means for releasably locking the shuttle valve in either the first end position or the second end position. Most desirably, the releasable locking means includes a resilient, generally C-shaped safety clip that is engageable in a snap-fit manner with the shuttle valve between the valve body and one of the enlarged heads of the shuttle valve. In this position, the safety clip limits the shuttle valve from further axial movement and locks it in place.

Preferably, the shuttle valve has an axial section with a reduced cross-sectional diameter that defines a chamber for establishing fluid communication between a selected inlet port and the outlet port. Most desirably, the chamber has an annular shape.

Most advantageously, the shuttle valve has means for visually indicating when fluid communication is established between one of the inlet ports and the outlet port. Most desirably, the indicator will take the form of a brightly-colored portion of the shuttle valve which is exposed upon the shuttle valve being positioned in one of its end positions.

BRIEF DESCRIPTION OF THE DRAWINGS

These and other objects and advantages of the present invention will become apparent from the following description of the accompanying drawings, which disclose one embodiment of the present invention. It is to be understood that the drawings are to be used for purposes of illustrations only, and not as a definition of the invention.

In the drawings, wherein similar reference numerals denote similar elements throughout the several views.

DETAILED DESCRIPTION OF THE PREFERRED EMBODIMENT

Figure 1:
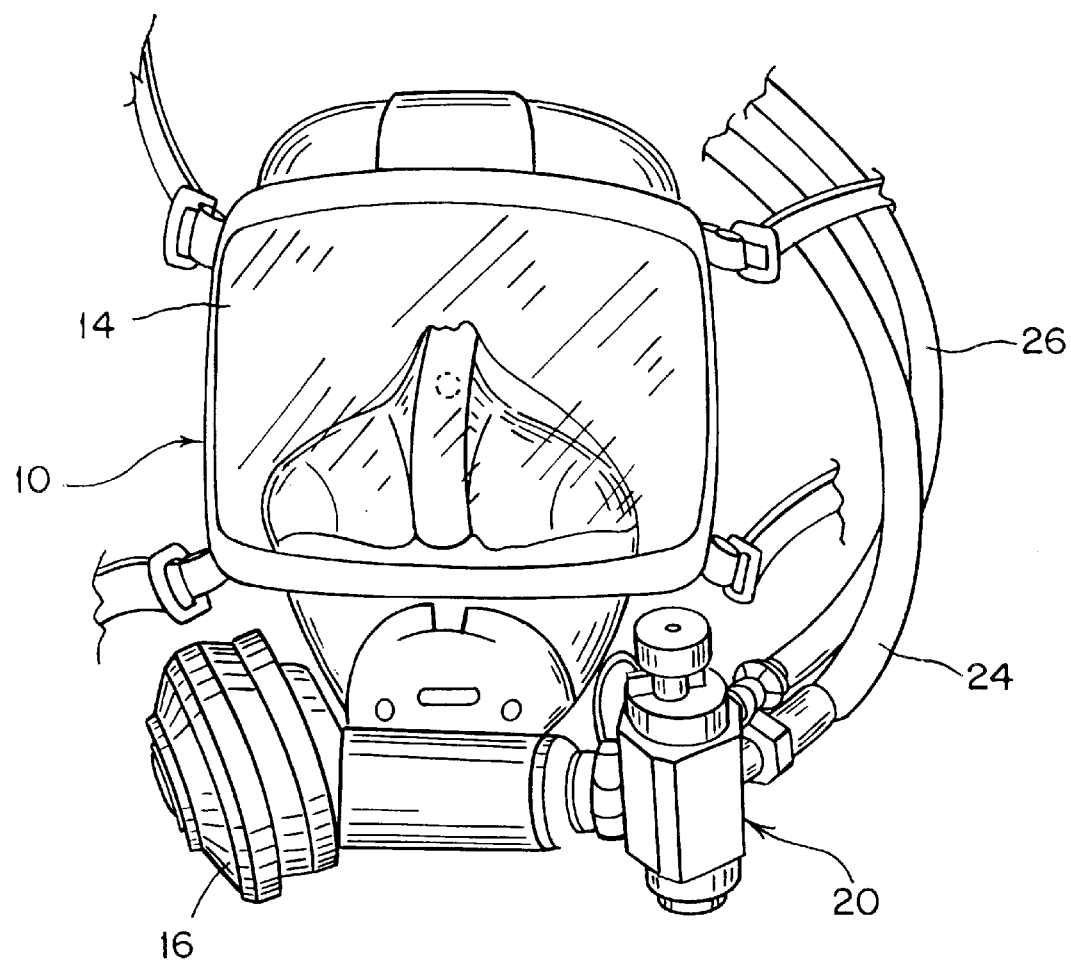
FIG. 1 is a perspective view of a manually operable control valve embodying the present invention installed in a scuba diving breathing apparatus.

Referring now in detail to the drawings and, in particular, FIG. 1 thereof, therein illustrated is a conventional scuba breathing apparatus 10, which includes a full face scuba diving mask 14 and a regulator apparatus 16, to which is attached a novel manually operable control valve embodying the present invention, generally designated by reference 20. Primary breathing gas supply line 24, and secondary breathing gas supply line 26 are each connected to control valve 20 and to their respective conventional breathing gas supply tanks (not shown) which may contain breathing gas such as oxygen and nitrogen in varying percentages.

As shown in FIGS. 2–6, manually operable control valve 20, includes an elongated tubular valve body 30 preferably made from a lightweight and durable material. Most desirably, the valve body 30 may be made from a plastic material, sold under the brand name Delrin® (a DuPont trademark). Valve body 30 includes a primary breathing gas supply inlet port 34, which may be connected to a primary gas supply line 24 (shown in FIG. 1) and a secondary breathing gas supply inlet port 40, which may be connected to a secondary gas supply line 26 (shown in FIG. 1).

Figure 5:
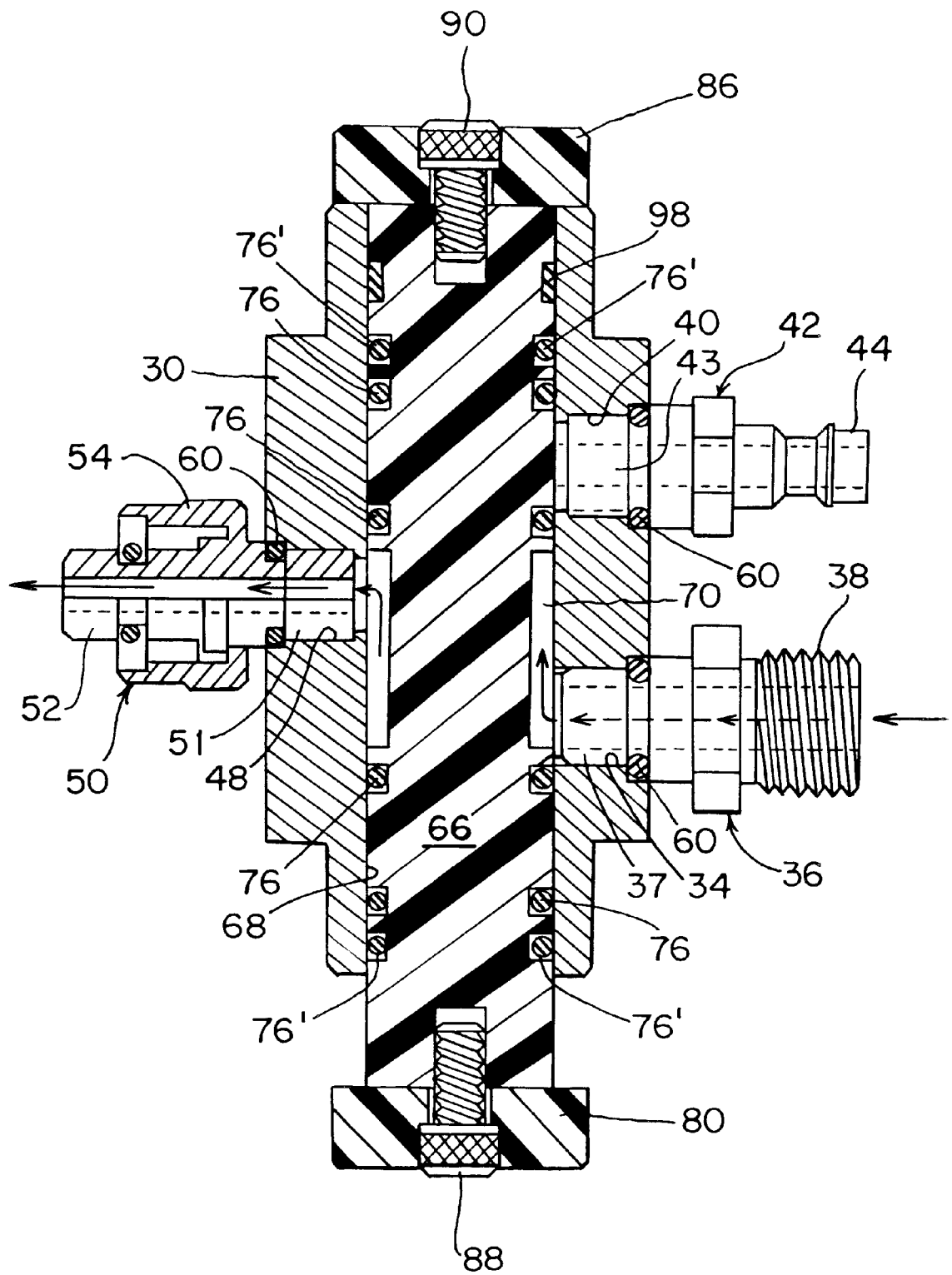
FIG. 5 is a sectional view, in part elevation, of the control valve, taken along line 5—5 of FIG. 4, showing the shuttle valve in the "down" position.
Figure 6:
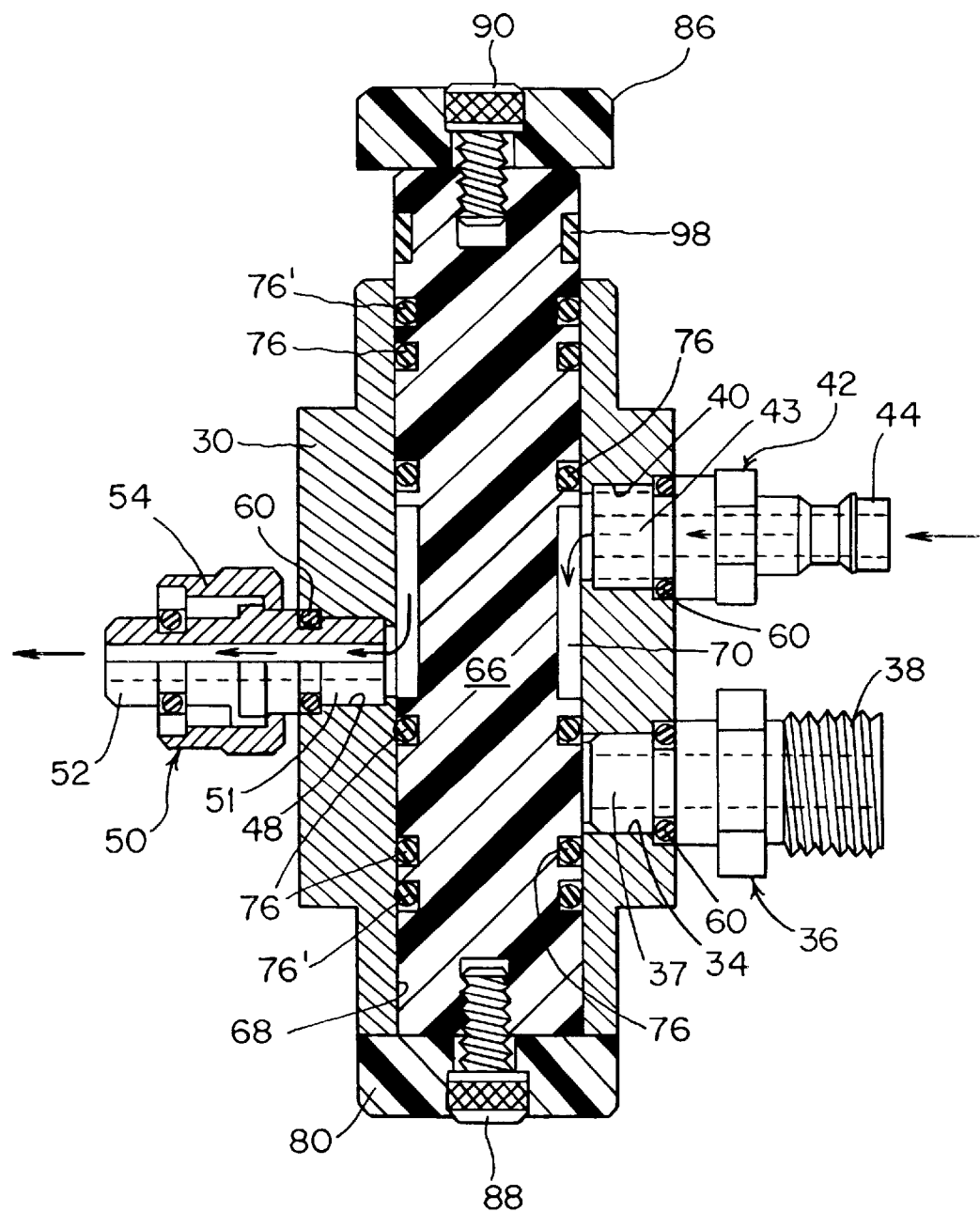
FIG. 6 is a sectional view, in part elevation, of the control valve, taken along line 6—6 of FIG. 4, showing the shuttle valve in the "up" position.

As can be seen in FIGS. 5 and 6, inlets ports 34 and 40 open onto an inner cylindrical, axial passageway 68 of valve body 30. The inner axial passageway 68 opens onto an outlet port 48 which may preferably be connected to a conventional regulator assembly 16 (shown in FIG. 1).

Preferably, inlet ports 34 and 40 and outlet port 48 are internally threaded so as to threadably receive the inner externally threaded ends of conventional fittings, as known to those skilled in the art, to facilitate connection with gas supply lines 24 and 26, and the regulator assembly 16, respectively. These conventional fittings, preferably made from stainless steel, include both threaded fittings and those fittings generally referred to as "Quick Disconnect" fittings, such as those sold commercially under the brand names Schrader™ fitting (for shallow depths), Air Source™ fitting and Air 2™ fitting. All three ports are identical, allowing control valve 20 to be configured for various diving situations using a plurality of conventional fittings.

As seen best in FIGS. 5 & 6, primary inlet port 34 is provided with threaded-type fitting 36 which is threaded on both ends. Its inner externally threaded end 37 is threadably received in inlet port 34 and its opposite outer end 38 is threaded for connection to a complementary coupling (not shown) or a primary gas supply line 24 (shown in FIG. 1). Similarly, secondary inlet port 40 is provided with "Quick Disconnect" fitting 42. Fitting 42 is threaded on its inner end 43, which is threadably received in inlet port 40. The opposite outer end of fitting 42 has a conventional quick-release coupling 44 for effecting a releasable locking engagement with a complementary coupling (not shown) or a secondary gas supply line 24.

Preferably, outlet port 48 is provided with a conventional regulator fitting 50, as known to those skilled in the art, to facilitate connection to regulator assembly 16 (shown in FIG. 1). Fitting 50 has a threaded inner end 51, which is threadably received in outlet port 48. The opposite outer end of fitting 50 has a conventional regulator coupling 52 for effecting releasable locking engagement with regulator assembly 16. Most desirably, fitting 50 is provided with locking nut 54. Locking nut 54 is internally threaded for threadable receipt thereof of a threaded coupling (not shown) of regulator assembly 16 to additionally secure fitting 50 with regulator assembly 16.

Most desirably, the inner end of each of fittings 36, 42 and 50 are provided with a sealing gasket or O-ring 60 to provide a fluid (both air and water) leak-resistant connection. O-ring 60 is preferably made from rubber, synthetic rubber, or plastic.

A spool-like, generally cylindrical shuttle valve 66 is slidably mounted within axial passageway 68 for linearly reciprocal movement between two end positions, namely a "down" position (FIG. 5) and an "up" position (FIG. 6). Shuttle valve 66 has a centrally located radially-recessed cylindrical channel of "reduced width" which defines an annular chamber 70 by which shuttle valve 66 establishes fluid communication between one of the inlet ports 34 or 40 and the outer port 48 when in either its "down" or "up" position.

More specifically, as seen in FIG. 5, when the shuttle valve 66 is in its "down" position, fluid communication is established with the primary gas supply passing through the primary inlet port 34 and outlet port 48 via internal chamber 70 (as shown by the arrows). In this position the upper "full width" section of shuttle valve 66 blocks off the secondary inlet port 40. Conversely, as seen in FIG. 6, when shuttle 66 is in the "up" position, fluid communication is established with the secondary gas supply passing through secondary inlet port 40 and outlet port 48 via internal chamber 70 (as shown by the arrows). In this position, the lower "full width" section of shuttle valve 66 blocks off the primary inlet port 34.

Most desirably, shuttle valve 66 is provided with a plurality of spaced-apart O-rings 76, preferably made of a rubber, synthetic rubber or plastic material, such as that sold under the trademark Viton™, to prevent leakage (both air and water) between spool shuttle valve 66 and valve body 30. O-rings 76' additionally serve the purpose of providing a wiping action to remove debris trapped between the valve body 30 and shuttle valve 66. This serves to ensure a tight leak resistant seal between the remaining O-rings of the shuttle valve 66 and the valve body 30.

The ends of the shuttle valve 66 are each provided with an enlarged disc-shaped head 80 and 86, which are preferably affixed to the ends of shuttle valve 66 by threaded bolts 88 and 90, respectively. Heads 80 and 86 each have a larger diameter than axial passageway 68, thereby limiting axial movement of shuttle valve 66 in valve body 30. Shuttle valve 66 has a length which is greater than that of valve body 30 and its axial passageway 68, to facilitate movement between its two end positions in which it establishes fluid communication between one of the inlet ports 34 or 40 and outlet port 48. As can be appreciated, the dimensions of shuttle valve 66, its "reduced width" central position and the location and dimensions of the inlet ports 34 and 40 and outlet port 48 are so selected so as to maintain the proper alignment of shuttle valve 66 in either of its two end positions to establish and properly maintain fluid communication between the respective ports.

Figure 2:
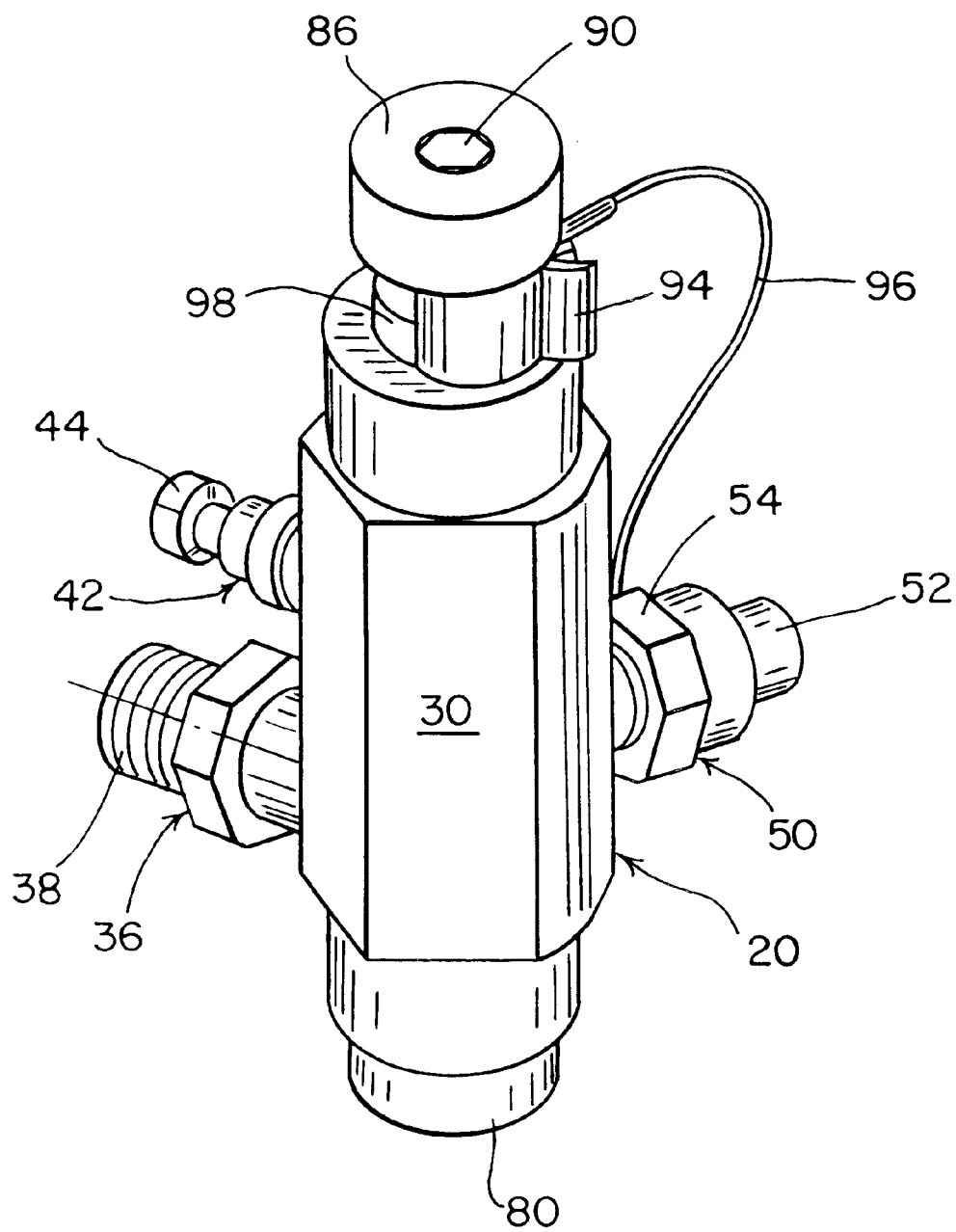
FIG. 2 is an enlarged, perspective view of the manually operable control valve having a generally C-shaped safety clip engaging the shuttle valve.
Figure 3:
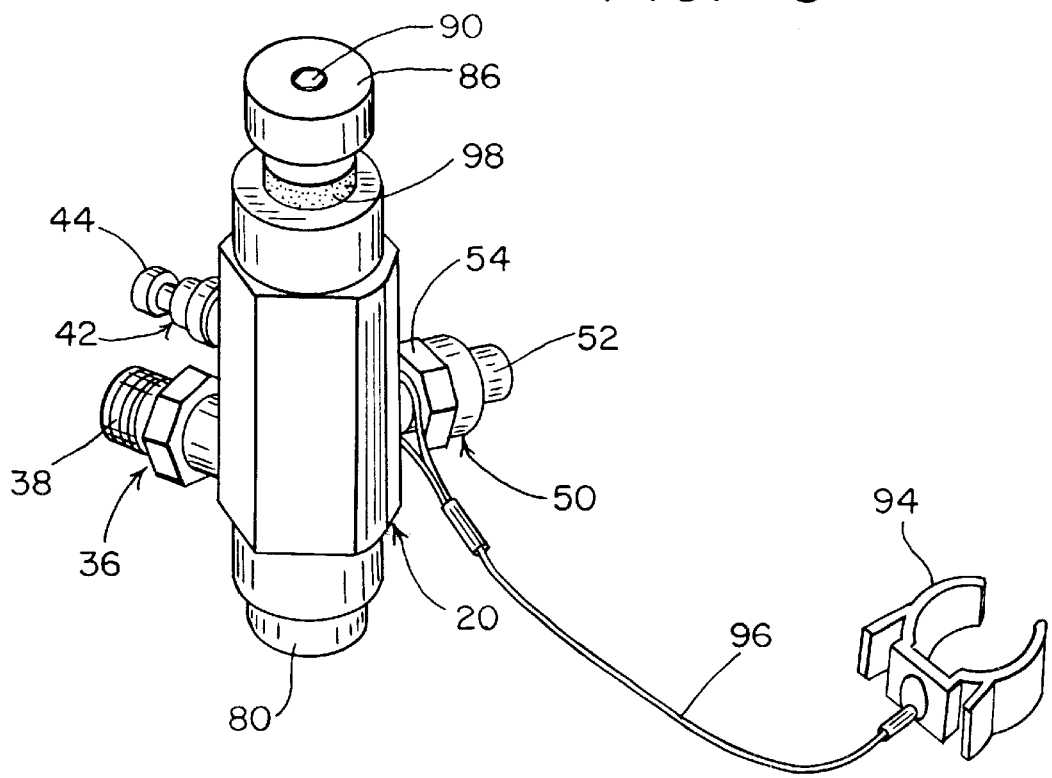
FIG. 3 is a perspective view of the control valve comparable to that of FIG. 2, but showing the C-shaped safety clip disengaged.
Figure 4:
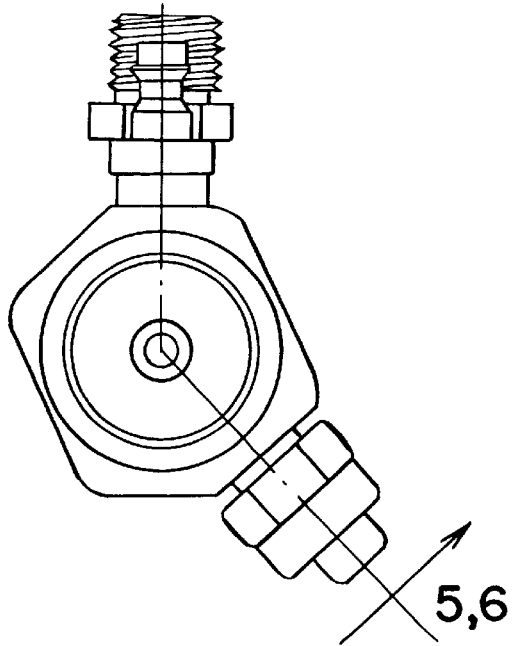
FIG. 4 is a plan view of the control valve.

As previously stated, safety is of the utmost importance when scuba diving. Preferably, as seen in FIG. 2, to maintain a higher degree of safety when scuba diving and to further prevent unintentional movement of shuttle valve 66, a generally C-shaped resilient safety clip 94, connected to valve body 30 by a wire, cord or the like 96, is releasably engaged with shuttle valve 66 between valve body 30 and head 86, thereby releasably locking shuttle valve 66 in its "up" position and preventing disengagement of an established fluid communication between secondary inlet port 40 and outlet port 48. This becomes especially important in hazardous situations, such as those mentioned in the prior art, whereby the control valve 20 may be accidentally jarred, inadvertently disengaging the desired breathing gas supply. As can be appreciated, C-shaped clip 94 is generally sized so that its height is generally equal to the difference in height between shuttle valve 66 and valve body 30. In this way, shuttle valve 66 is effectively locked in place until the clip is removed. FIG. 3 shows control valve 20 with C-shaped clip 94 disengaged from shuttle valve 66 but connected to valve body 30 by a wire, cord or the like 96.

As seen in FIG. 2 and 3, the upper end of the shuttle valve 66 is provided with a readily-visible and observable colored fluorescent band 98 which signifies to a diver which gas supply is engaged, even in dark or hazardous situations. Fluorescent band 98 may be of any bright color and affixed along the circumference of an exposed portion of shuttle valve 66. When fluorescent band 98 is visible, it indicates that the fluid communication is established with a secondary breathing gas supply. When the fluorescent band 98 is not visible, this indicates fluid communication with a primary gas supply.

In operation of control valve 20 and a breathing mask assembly, breathing gas is normally supplied from the primary gas supply. The shuttle valve is in its "down" position and the breathing gas passes through selected inlet port 34 via fitting 36. Breathing gas then passes through inner axial passageway 68 via internal chamber 70, exiting control valve 20 through outlet port 48 and fitting 50, and finally through a regulator assembly 16, so that a diver may breathe a selected breathing gas supply. When the primary breathing gas supply is exhausted, a diver must switch to a secondary breathing gas supply.

Control valve 20 allows a diver to simply change the breathing gas supply because the valve has only one moving part, shuttle valve 66. A diver simply removes C-shaped clip 94, moves shuttle valve 66 into the "up" position, thereby engaging the secondary gas supply. The diver positions C-shaped clip 94 so that it engages shuttle valve 66 between enlarged head 86 and valve body 30. Fluid communication with the secondary gas supply is effectively locked in place. Breathing gas is then supplied through inlet port 40 via fitting 42. Breathing gas is supplied to diver in the same manner described for the primary gas supply. Further, maintenance of control valve 20 is made easy with only one moving part since shuttle valve 66 can be easily removed, cleaned and replaced in a facile manner in a short amount of time.

The simplistic operation of control valve 20 allows a diver to switch breathing gas supplies in less than a second. This is particularly useful to a diver utilizing a full face mask, whereas it allows the diver to switch to their alternate air supply without discarding their mask (a valuable feature when diving in toxic or hazardous locations).

Various modifications may be made to the present invention as will be apparent to those skilled in the art. For example, while a C-shaped safety clip is preferably used, other types of friction-type clips or other safety locking mechanisms may be used. Furthermore, although the valve body and shuttle valve are preferably made of a plastic material, the body and shuttle valve may be made of metallic material. Additionally, the florescent band may be affixed to either end of the shuttle valve, to indicate engagement of a breathing gas supply.

Accordingly, while only one embodiment of the present invention has been shown and described, it is to be understood that many changes and modifications may be made thereunto without departing from the spirit and scope of the invention as disclosed herein.

What is claimed is:

1. A manually operable control valve for a breathing apparatus to allow a user to alternate from a primary breathing gas supply to a secondary breathing gas supply, comprising;

an elongated tubular valve body having an axial breathing gas passageway having a cylindrical cross-section, said valve body having a pair of spaced-apart inlet ports each having an inner end opening onto said axial passageway and an outer end opening connected to a separate breathing gas supply, and one outlet port having an inner end opening onto said axial passageway and an outer end opening connected to the breathing apparatus; and a linearly reciprocable shuttle valve having a cylindrical cross-section slidably mounted in said axial passageway for movement between a first end position, which establishes fluid communication between said first inlet port and said outlet port, and a second end position, which establishes fluid communication between said second inlet port and said outlet port, said shuttle valve having a length greater than that of said valve body and each end of said shuttle valve has an enlarged head affixed thereto having a width greater than that of said valve body, which enlarged heads serve to limit movement of said shuttle valve between said first and second end positions thereof and wherein said shuttle valve further comprises an axial section having a reduced cross-sectional diameter which defines an annular chamber for establishing fluid communication between said inlet ports and said outlet port.

2. A manually operable control valve as in claim 1, wherein said enlarged heads are disc-shaped.

3. A manually operable control valve as in claim 1, further comprising means for releasably locking said shuttle valve in at least one of said first and second end positions thereof.

4. A manually operable control valve as in claim 3, wherein said means for releasably locking said shuttle valve comprises a resilient, generally C-shaped safety clip releasably mounted on said shuttle valve in a snap-fit manner between said valve body and one of said enlarged heads of said shuttle valve.

5. A manually operable control valve as in claim 1, additionally including means for visually indicating that said shuttle valve is in one of said end positions thereof.

6. A manually operable control valve as in claim 1, wherein said chamber has an annular shape.

7. A manually operable control valve as in claim 1, wherein said shuttle valve is provided with a plurality of spaced-apart O-rings to prevent leakage between said shuttle valve and valve body.

8. A manually operable control valve as in claim 7, wherein a pair of O-rings are provided generally adjacent to each end of said shuttle valve.

9. A manually operable control valve as in claim 1, wherein said shuttle valve is made of one piece.

10. A manually operable control valve as in claim 1, wherein said valve body is made of one piece.

11. A manually operable control valve as in claim 1, wherein at least one of said enlarged heads is removably attached to said shuttle valve.

12. A manually operable control valve as in claim 4, wherein said C-shaped safety clip has a height about equal to the difference in length between said valve body and shuttle valve.

* * * * *